US010800100B2

(12) United States Patent
Okazaki et al.

(10) Patent No.: US 10,800,100 B2
(45) Date of Patent: Oct. 13, 2020

(54) LAMINATION MOLDING APPARATUS (71) Applicant: Sodick Co., Ltd., Kanagawa (JP)

(72) Inventors: Shuji Okazaki, Kanagawa (JP); Katsutaka Muranaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 16/710,445

(22) Filed: Dec. 11, 2019

(65) Prior Publication Data

US 2020/0230880 A1 Jul. 23, 2020

(30) Foreign Application Priority Data

Jan. 18, 2019 (JP) .................................. 2019-007186

(51) Int. Cl.
| | |
|---|---|
| B29C 67/00 | (2017.01) |
| B29C 64/245 | (2017.01) |
| B29C 64/295 | (2017.01) |
| B29C 64/232 | (2017.01) |
| B29C 64/209 | (2017.01) |
| B29C 64/153 | (2017.01) |
| B29C 64/268 | (2017.01) |
| B33Y 30/00 | (2015.01) |

(52) U.S. Cl.
CPC .......... B29C 64/245 (2017.08); B29C 64/153 (2017.08); B29C 64/209 (2017.08); B29C 64/232 (2017.08); B29C 64/268 (2017.08); B29C 64/295 (2017.08); *B33Y 30/00* (2014.12)

(58) Field of Classification Search
CPC ........ B33Y 10/00; B33Y 30/00; B29C 64/295
See application file for complete search history.

(56) References Cited

U.S. PATENT DOCUMENTS

| | | | |
|---|---|---|---|
| 9,839,960 B2 * | 12/2017 | Okazaki | ................ B29C 64/153 |
| 2011/0256253 A1 * | 10/2011 | Amaya | .................. B29C 64/40 |
| | | | 425/78 |
| 2018/0290210 A1 | 10/2018 | Okazaki et al. | |
| 2019/0061001 A1 | 2/2019 | Araie et al. | |

FOREIGN PATENT DOCUMENTS

| | | |
|---|---|---|
| JP | 2013-022611 A | 2/2013 |
| JP | 6295001 B1 | 3/2018 |
| JP | 6340452 B1 | 6/2018 |
| JP | 2018-530457 A | 10/2018 |
| WO | 2017051029 A1 | 3/2017 |

OTHER PUBLICATIONS

Office Action dated Jun. 2, 2020 in corresponding Japanese Patent Application No. 2019-007186; 8 pages.

* cited by examiner

*Primary Examiner* — Joseph S Del Sole
*Assistant Examiner* — Thu Khanh T Nguyen
(74) *Attorney, Agent, or Firm* — Maier & Maier, PLLC (57) ABSTRACT

A lamination molding apparatus includes a molding table, a molding table driver, and a chuck. The molding table includes a molding region and a temperature adjusting unit. In the molding region, a desired three-dimensional molded object is formed. The temperature adjusting unit has a heating unit with a heater, and a cooling unit with a cooler. The heating unit and the cooling unit are arranged to be stacked in a vertical direction. The molding table driver moves the molding table in the vertical direction. The chuck detachably fixes the temperature adjusting unit to the molding table driver at one fixing point.

9 Claims, 12 Drawing Sheets

LAMINATION MOLDING APPARATUS

CROSS-REFERENCE TO RELATED APPLICATION

This application claims priority to Japanese Patent Application, No. 2019-007186 filed on Jan. 18, 2019, the entire contents of which are incorporated by reference herein.

TECHNICAL FIELD

The present invention relates to a lamination molding apparatus.

BACKGROUND ART

There is a plurality of methods for lamination molding. For example, in powder bed fusion, material powder is spread on a molding table movable in the vertical direction to form a material layer. Then, a predetermined portion of the material layer is irradiated with a beam such as a laser beam or an electron beam, and the solidified layer is formed by melting or sintering the material powder at an irradiated position. The above procedure is repeated to laminate a plurality of the solidified layers, and a desired three-dimensional molded object is produced. Here, the solidified layer includes a molten layer and a sintered layer. Further, the laminated plurality of the solidified layers is called a solidified body.

As disclosed in U.S. Pat. No. 10,406,600, in such lamination molding, the molding table is usually configured to be temperature adjustable, and the material layer is preheated to a predetermined temperature before irradiation with the beam to form the solidified layer. Further, as disclosed in U.S. Patent Publication No. 2019/0061001, heating and cooling of the molding table may be repeatedly performed during molding to adjust the temperature of the solidified layer.

SUMMARY OF INVENTION

Technical Problem

In lamination molding, the temperature of the molding table is appropriately adjusted. Because of the temperature adjustment of the molding table, a positional shift due to thermal displacement occurs between the molding table and a molding table driver moving the molding table in the vertical direction, and accuracy of the lamination molding can be lowered.

The present invention has been made in consideration of the afore-mentioned circumstances. An object of the present invention is to provide a lamination molding apparatus capable of highly accurate molding.

Solution to Problem

According to the present invention, provided is a lamination molding apparatus, comprising: a molding table including a molding region in which a desired three-dimensional molded object is formed, and a temperature adjusting unit having a heating unit with a heater and a cooling unit with a cooler, the heating unit and the cooling unit being stacked in a vertical direction; a molding table driver moving the molding table in the vertical direction; and a chuck fixing the temperature adjusting unit detachably to the molding table driver at one fixing point.

Advantageous Effects of Invention

In the present invention, the temperature adjustable molding table and the molding table driver are fixed at one fixing point. Therefore, a starting point of expansion and contraction due to heating and cooling is only one fixing point, and occurrence of displacement is prevented. As a result, highly accurate molding can be performed.

DESCRIPTION OF EMBODIMENTS

Hereinafter, the embodiments of the present invention will be described with reference to the drawings. The characteristic matters shown in the embodiments described below can be combined with each other. Moreover, each characteristic matter independently constitutes an invention.

A lamination molding apparatus 100 according to the embodiment of the present invention repeats a step of forming a material layer 8, and a step of forming a solidified layer. A beam, for example a laser beam L, is irradiated on an irradiation region of the material layer 8 to melt or sinter the material layer 8 and form the solidified layer. In this way, the lamination molding apparatus 100 produces a three-dimensional molded object having a desired shape by laminating a plurality of the solidified layers.

Figure 1:
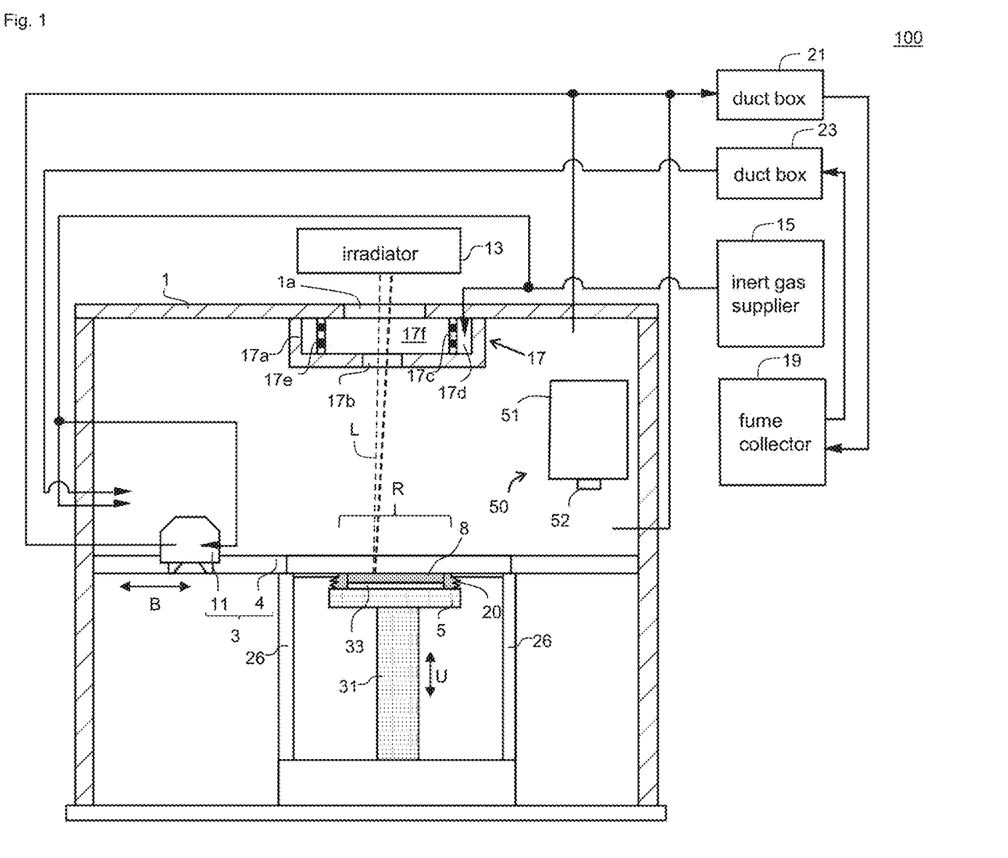
FIG. 1 is a schematic front view of a lamination molding apparatus 100 according to an embodiment of the present invention.

As shown in FIG. 1, the lamination molding apparatus 100 of the present invention includes a chamber 1, an irradiator 13, a material layer forming device 3, and a processing unit 50. The chamber 1 covers a predetermined molding region R and is filled with inert gas having a predetermined concentration.

The material layer forming device 3 is provided in the chamber 1. In the molding region R, the material layer forming device 3 forms the material layer 8 for each of a plurality of divided layers obtained by dividing the desired three-dimensional molded object at a predetermined height. The material layer forming device 3 includes a base frame 4 and a recoater head 11. In the present embodiment, a material constituting the material layer 8 is material powder. The material powder is, for example, metal powder and has spherical shape with an average particle diameter of 20 μm.

The base frame 4 is provided with a molding table 5, and the desired three-dimensional molded object is laminated on an upper surface of the molding table 5. In other words, the molding table 5 has the molding region R in which the desired three-dimensional molded object is formed. The molding table 5 can be moved in a vertical direction, which is showed as an arrow U in FIG. 1, by a molding table driver 31. In the present embodiment, when the lamination molding apparatus 100 is used, a base plate 33 is disposed on the molding table 5 and the first material layer 8 is formed on the base plate 33. Here, the irradiation region of the material layer 8 is in the molding region R, and roughly matches an area defined by an outline shape of the desired three-dimensional molded object in each divided layer.

Peripheral walls 26 are provided around the molding table 5. In the present embodiment, a bellows member 20 is provided between the molding table 5 and the peripheral walls 26. The bellows member 20 prevents heat of the molding table 5 from being transmitted to surroundings. Unsolidified material powder is retained inside the bellows member 20. Details of the molding table 5 will be described later.

Figure 2:
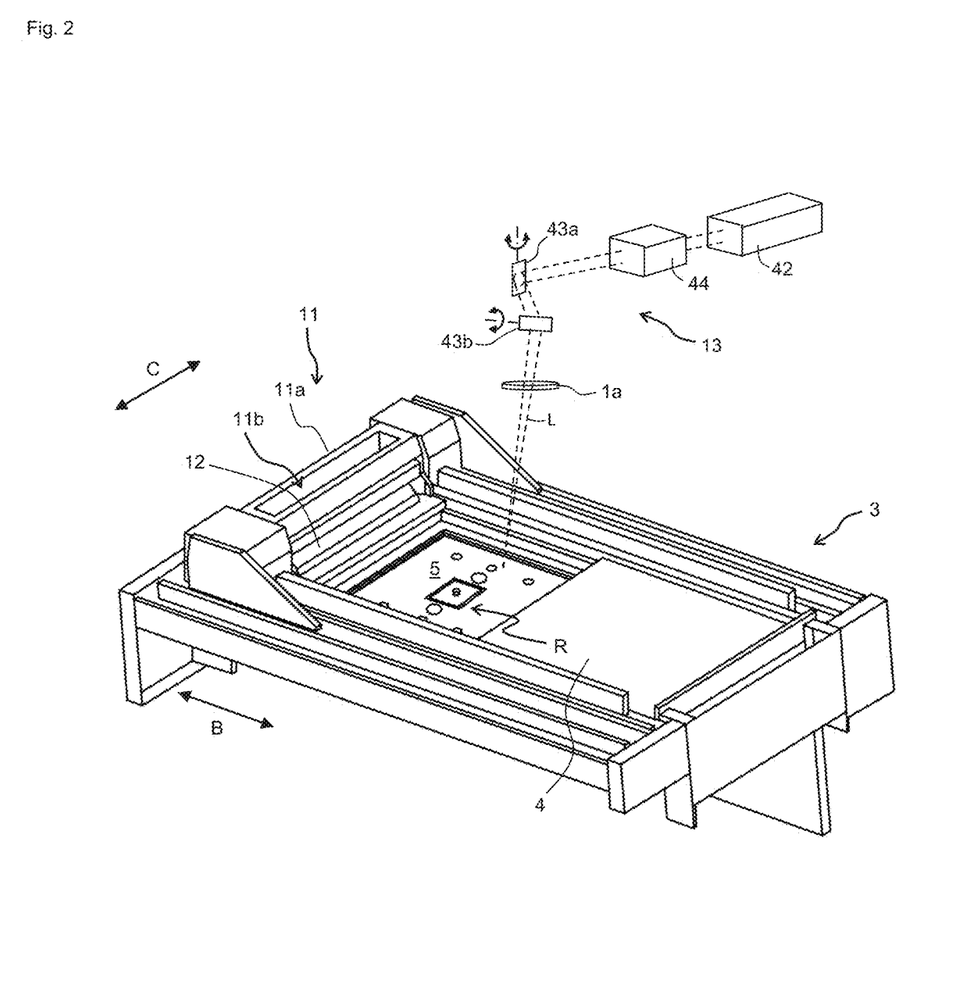
FIG. 2 is a perspective view of a material layer forming device 3 and an irradiator 13 according to the embodiment of the present invention.

The recoater head 11 shown in FIG. 2 reciprocates along a horizontal direction showed as an arrow B. The recoater head 11 has a material holding section 11a, a material supplying section 11b, and a material discharging section. The material holding section 11a accommodates the material powder. The material supplying section 11b is provided on an upper surface of the material holding section 11a and serves as an opening receiving the material powder which is supplied from a material supplying device (not shown) to the material holding section 11a. The material discharging section is provided on a bottom surface of the material holding section 11a and discharges the material powder accommodated in the material holding section 11a. The material discharging section has a slit shape extending in a horizontal direction showed as an arrow C, which is orthogonal to a moving direction of the recoater head 11. Further, blades 12 are provided on both side of the recoater head 11, respectively. The blade 12 spreads the material powder. That is, the blade 12 planarizes the material powder discharged from the material discharging section to form the material layer 8.

The chamber 1 is supplied with the inert gas having the predetermined concentration. Further, inert gas containing fume generated when the material layer 8 is melted or sintered is discharged from the chamber 1. Preferably, the inert gas discharged from the chamber 1 is returned to the chamber 1 after the fume is removed. Specifically, an inert gas supplier 15 is connected to the chamber 1, and a fume collector 19 is connected to the chamber 1 via duct boxes 21 and 23. Positions and a number of supply ports and discharge ports of the inert gas provided in the chamber 1 are not particularly limited. In the present invention, the inert gas does not substantially react with the material and is appropriately selected, according to a type of the material, from nitrogen gas, argon gas, helium gas, etc.

The inert gas supplier 15 has a function of supplying inert gas. The inert gas supplier 15 is, for example, an inert gas generator that generates the inert gas having the predetermined concentration from ambient air, or a gas cylinder in which the inert gas having the predetermined concentration is stored. As the inert gas generator, various types of generator such as a membrane separation system and a PSA system may be adopted depending on the type and concentration of the generated inert gas. The inert gas supplier 15 supplies the inert gas to the supply port provided in the chamber 1 and fills the chamber 1 with the inert gas having the predetermined concentration.

The inert gas containing a large amount of the fume discharged from the discharge port of the chamber 1 is sent to the fume collector 19 and returned to the chamber 1 after removing the fume. The fume collector 19 needs to have a function of removing fume, and is, for example, an electrostatic precipitator or a filter.

The processing unit 50 includes a processing head 51 having a spindle 52 and a processing head driver for driving the processing head 51. The processing head driver includes, for example, an X-axis guide rail, an X-axis slider, an X-axis moving body, a Y-axis guide rail, a Y-axis slider, a Y-axis moving body, a Z-axis guide rail and a Z-axis slider. The X-axis guide rail is fixed to a bed and extends in the X-axis direction. The X-axis slider slides along the X-axis guide rail. The X-axis moving body is fixed to the X-axis slider. The Y-axis guide rail is fixed to the X-axis moving body and extends in the Y-axis direction. The Y-axis slider slides along the Y-axis guide rail. The Y-axis moving body is fixed to the Y-axis slider. The Z-axis guide rail is fixed to the Y-axis moving body and extends in the Z-axis direction. The Z-axis slider slides along the Z-axis guide rail and fixes the processing head 51. The spindle 52 is configured so that a cutting tool, such as an end mill, can be attached on the spindle 52 and rotated. The spindle 52 can perform cutting of a surface or an unnecessary portion of the solidified layer. The cutting tools may be exchanged during molding by an automatic tool changer (not shown). With such configuration, the processing unit 50 can perform cutting on the solidified layer at a desirable position in the chamber 1.

Instead of the above-described embodiment, the processing unit may include a cutting head that holds a cutting tool such as a tool bit and rotates the cutting tool along a vertical rotation axis, and a processing head driver for driving the cutting head along horizontal directions. The processing head driver includes, for example, a pair of first horizontal movement mechanisms, a gantry provided in the pair of first horizontal movement mechanisms, and a second horizontal movement mechanism attached to the gantry and having the processing head fixed thereto.

The irradiator 13 is provided above the chamber 1. The irradiator 13 irradiates a predetermined portion of the material layer 8 formed on the molding region R with the beam such as the laser beam L to melt or sinter the material layer 8 at an irradiated position, and to form the solidified layer. As shown in FIG. 2, the irradiator 13 includes a light source 42, a biaxial galvanometer scanner, and a focus control unit 44. The galvanometer scanner includes galvanometer mirrors 43a and 43b and actuators (not shown) for rotating each of the galvanometer mirrors 43a and 43b, respectively.

The light source 42 emits the laser beam L. Here, the laser beam L is capable of sintering or melting the material powder. The laser beam L is, for example, a $CO_2$ laser, a fiber laser, a YAG laser.

The focus control unit 44 focuses the laser beam L output from the light source 42 to adjust the laser beam L to a desired spot diameter. The galvanometer mirrors 43a and 43b control to scan two-dimensionally the laser beam L output from the light source 42. Rotational angles of the galvanometer mirrors 43a and 43b are controlled in accordance with magnitudes of rotational angle control signals input from a controller (not shown). With this feature, it is possible to irradiate a desired position with the laser beam L by changing the magnitude of the rotation angle control signal input to each actuator of the galvanometer scanner.

The laser beam L passed through the galvanometer mirrors 43a and 43b is transmitted through a window 1a provided in the chamber 1, and the material layer 8 formed in the molding region R is irradiated with the laser beam L. The window 1a is made of material that can transmit the laser beam L. For example, if the laser beam L is the fiber laser or the YAG laser, the window 1a may be made of quartz glass.

A window contamination prevention device 17 is provided on an upper surface of the chamber 1 so as to cover the window 1a. The window contamination prevention device 17 includes a cylindrical housing 17a and a cylindrical diffusion member 17c disposed in the housing 17a. An inert gas supply space 17d is provided between the housing 17a and the diffusion member 17c. On a bottom of the housing 17a, an opening 17b is provided inside the diffusion member 17c. The diffusion member 17c is provided with a large number of pores 17e, and the clean inert gas supplied into the inert gas supply space 17d fills a clean room 17f through the pores 17e. The clean inert gas filled in the clean room 17f is ejected to downward direction of the window contamination prevention device 17 through the opening 17b.

The irradiator may be configured to irradiate the material layer 8 with an electron beam. The electron beam melts or sinters the material layer 8 to form the solidified layer. For example, the irradiator includes a cathode electrode, an anode electrode, a solenoid, and a collector electrode. The cathode electrode emits electrons. The anode electrode converges and accelerates the electrons. The solenoid generates a magnetic field to converge the electron beam in one direction. The collector electrode is electrically connected to the material layer 8. A voltage is applied between the cathode electrode and the collector electrode.

Figure 3:
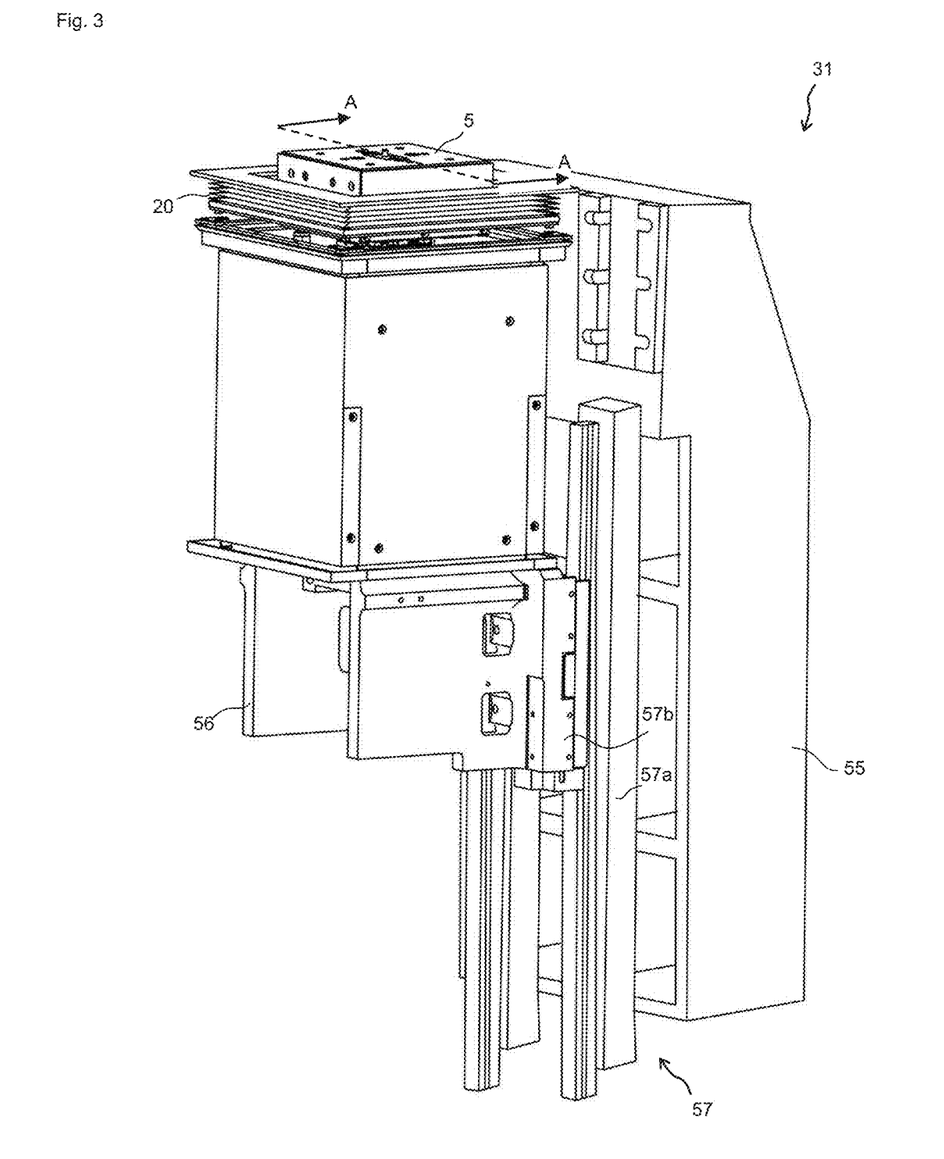
FIG. 3 is a perspective view of a molding table driver 31.
Figure 4:
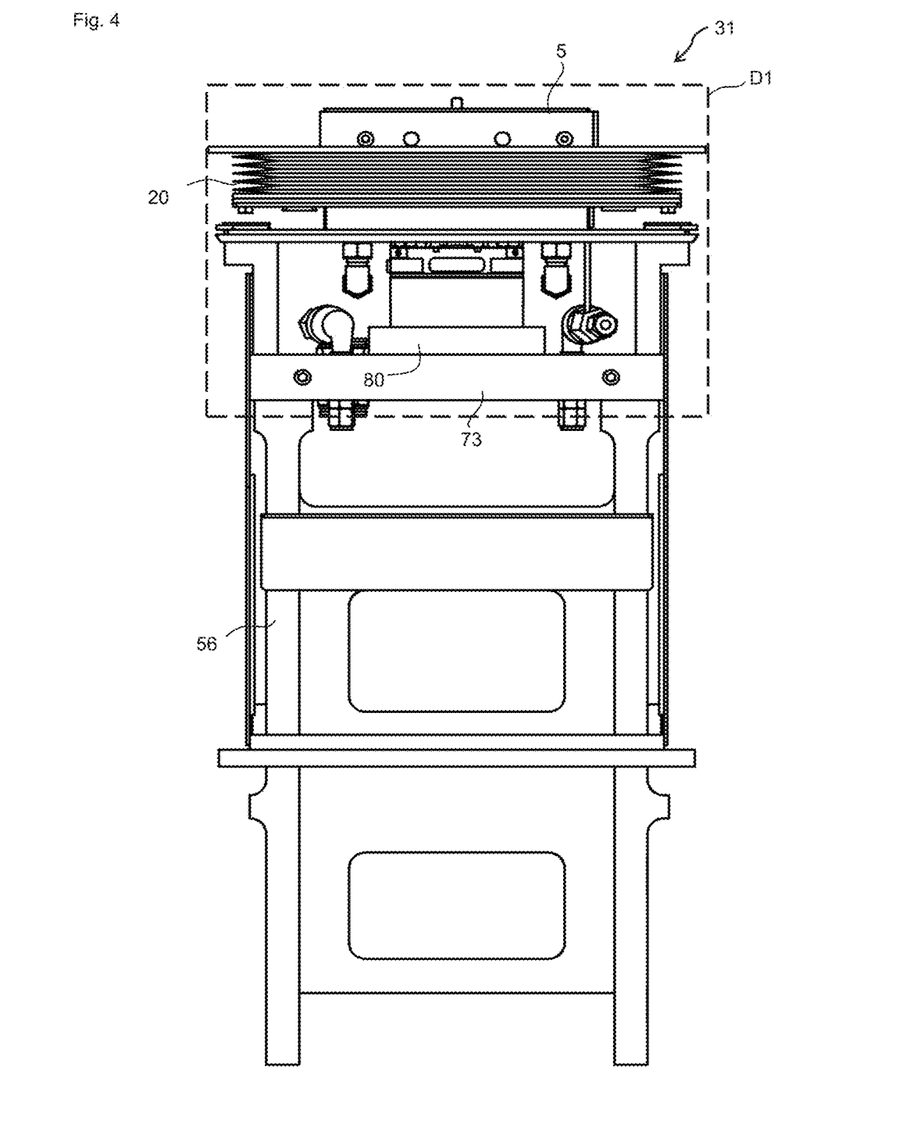
FIG. 4 is a front transparent view of the molding table driver 31.

The molding table driver 31 will be described with reference to FIG. 3 and FIG. 4. The configuration of the molding table driver 31 described below is merely an example, and any other embodiment may be used as long as it has an actuator for moving the molding table 5 in the vertical direction. In the present embodiment, the molding table driver 31 includes a guide base 55, a slide base 56 which can be driven in the vertical direction with respect to the guide base 55 and connected to the molding table 5, and a screw feed mechanism (not shown). The screw feed mechanism includes a screw shaft, a nut screwed with the screw shaft, and a motor rotationally driving the screw shaft.

A slide mechanism 57 is attached to the guide base 55. The slide mechanism 57 includes a rail 57a and a slide member 57b which is slidable along the rail 57a. The guide base 55 supports the screw shaft of the screw feed mechanism.

The slide member 57b and the nut of a screw feed mechanism are attached with the slide base 56. By rotating the screw shaft by the motor, the nut is screwed and moved up and down. Along with this, the slide member 57b moves in the vertical direction along the rail 57a, and the slide base 56 moves in the vertical direction. Then, the molding table 5 moves in the vertical direction.

A constant temperature member 73 is provided on an upper side of the slide base 56. The constant temperature member 73 is configured to be capable of maintaining a constant temperature. For example, the constant temperature member 73 has a passage in which normal temperature water circulates. In this way, thermal displacement of the molding table driver 31 can be suppressed. A chuck 80, which is described later, is attached to an upper side of the constant temperature member 73.

Figure 5:
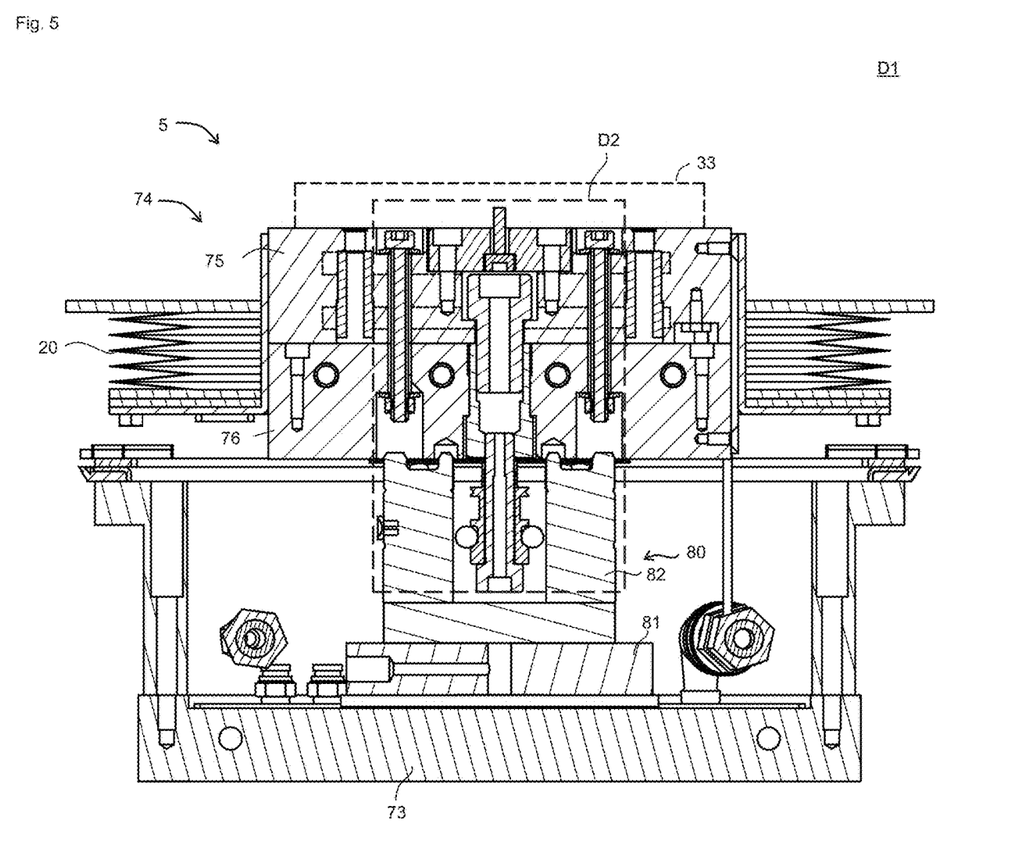
FIG. 5 is a cross-sectional view of a molding table 5 and a chuck 80.

With reference to FIG. 5, the configuration of the molding table 5 will be described. FIG. 5 corresponds to a cross-sectional view taken along the line A-A in a region D1 shown in FIG. 3 and FIG. 4.

As shown in FIG. 5, the molding table 5 includes a temperature adjusting unit 74 adjusting the temperature of the molding table 5. Further, a chuck 80 fixing the molding table 5 to the molding table driver 31 is provided below the molding table 5.

The temperature adjusting unit 74 includes a heating unit 75 and a cooling unit 76. The heating unit 75 and the cooling unit 76 are arranged to be stacked in the vertical direction. In the present embodiment, the heating unit 75 is disposed on an upper surface of the cooling unit 76. In this way, compared with the case where the heating unit 75 is arranged below the cooling unit 76, the heat from the heating unit 75 transmitted to the chuck 80 and the molding table driver 31 can be reduced. However, the heating unit 75 may be disposed underneath the cooling unit 76.

The heating unit 75 includes a heater 75a. The heater 75a is, for example, an electric heater with a heating element or a pipe through which a heat medium can be circulated. The heating unit 75 is configured to be capable of being heated to, for example, 300° C. by the heater 75a. The cooling unit 76 includes a cooler 76a. The cooler 76a is, for example, a pipe through which a refrigerant can be circulated. The cooling unit 76 is configured to be capable of being cooled to, for example, −20° C. by the cooler 76a. The temperature adjusting unit 74 is detachably fixed to the molding table driver 31 by the chuck 80 at one fixing point. In particular, it is preferable that the one fixing point of the molding table 5 with respect to the molding table driver 31 be a central portion in a plan view of the molding table 5. Displacement of the temperature adjusting unit 74 is more preferably prevented by restraining the central portion of the molding table 5 at the one fixing point.

The chuck 80 is disposed below the molding table 5. The configuration of the chuck 80 described below is merely an example, and any other configuration may be used as long as the molding table 5 can be detachably fixed to the molding table driver 31 at the one fixing point. The chuck 80 is controlled by a controller (not shown), and fixing and releasing of the molding table 5 are switched. The chuck 80 includes a base 81, a clamp 82 having a bottomed cylindrical shape and disposed on the base 81, a centering plate 87 engaged with the clamp 82, and a shaft 83 inserted into the clamp 82.

In the clamp 82, a plurality of locking balls 84 are arranged as a locking member for holding the shaft 83. The plurality of locking balls 84 are arranged in a circle at regular intervals. By locking of the locking ball 84 with a locking portion 83d of the shaft 83, the shaft 83 is gripped in the clamp 82. Instead, the locking member may have a claw shape or a pin shape.

Figure 6:
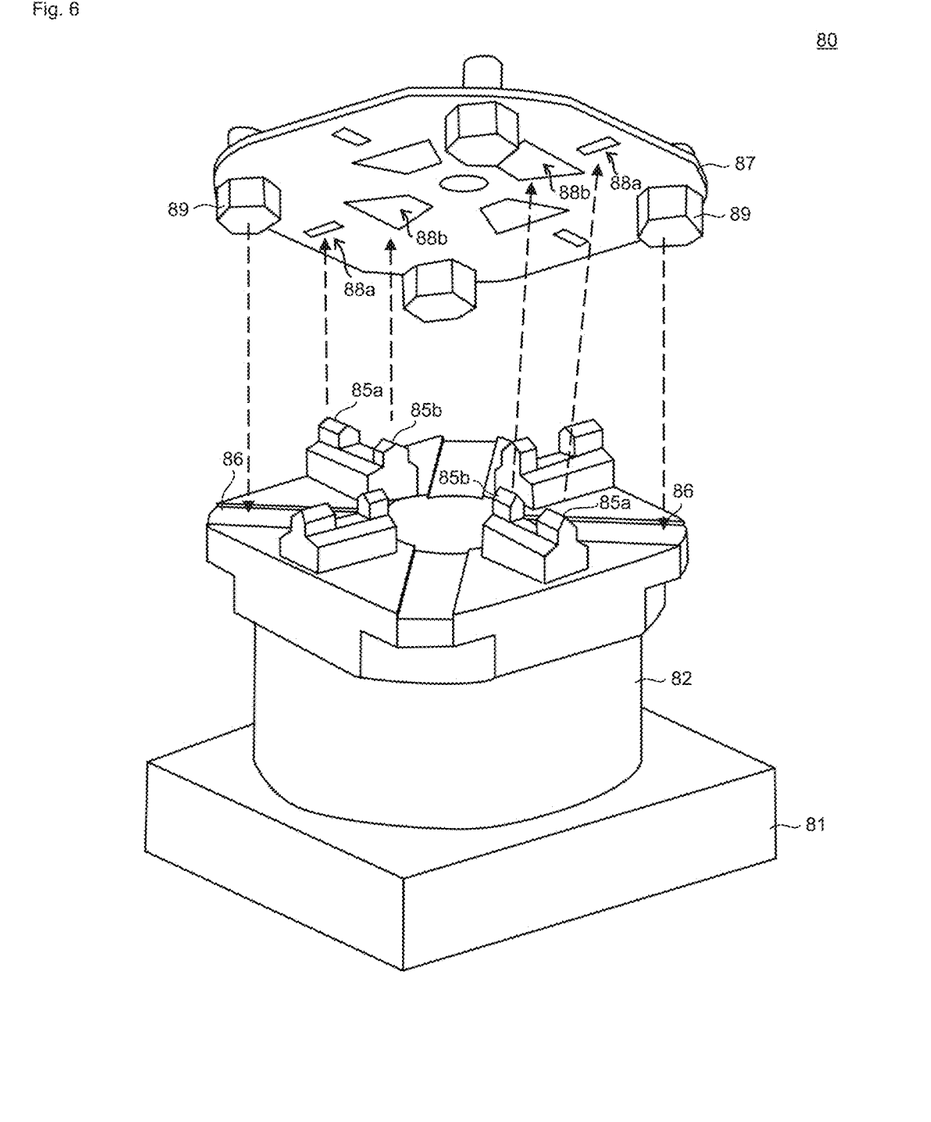
FIG. 6 illustrates an engagement between a clamp 82 and a centering plate 87 in the chuck 80.

As shown in FIG. 6, a plurality of first convex portions 85a and a plurality of second convex portions 85b are provided on an upper surface of the clamp 82 in a concentric circumference in a plan view. Furthermore, a plurality of fitting portions 86 formed radially from a center of the clamp 82 in a plan view are provided on the upper surface of the clamp 82. An upper surface of the fitting portion 86 is polished to define a horizontal reference surface.

The centering plate 87 is provided with a plurality of first openings 88a through which the first convex portions 85a are inserted and a plurality of second openings 88b through which the second convex portions 85b are inserted. Further, on a lower surface of the centering plate 87, a plurality of support legs 89 fitting into the fitting portion 86 is attached.

With such a configuration, the centering plate 87 is positioned in a rotational direction by the first convex portions 85a of the clamp 82 being inserted into the first openings 88a of the centering plate 87. The centering plate 87 is positioned in a height direction by fitting the support legs 89 to the fitting portions 86 of the clamp 82.

Figure 7:
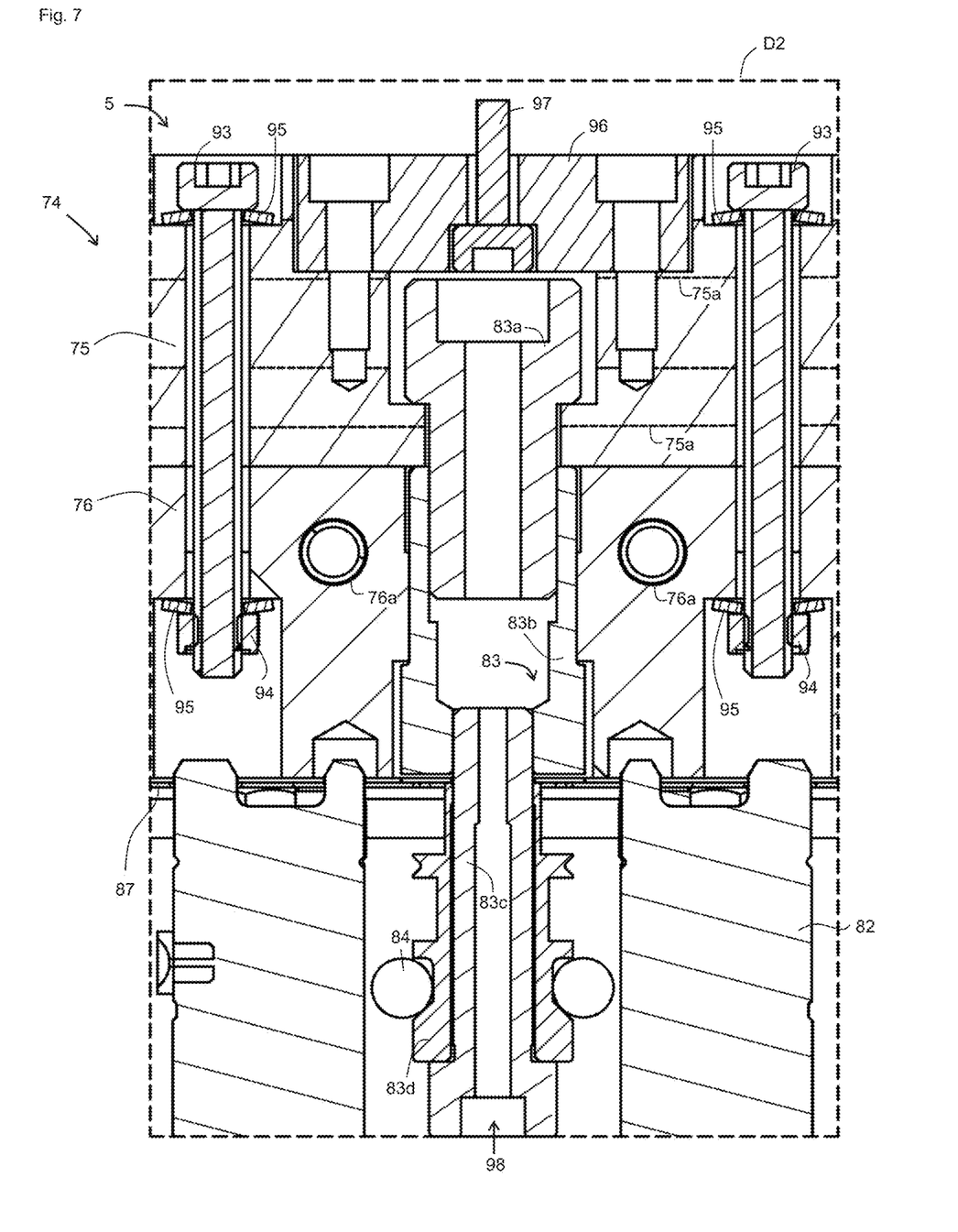
FIG. 7 is an enlarged view of a region D2 in FIG. 5.

As shown in FIG. 7, the shaft 83 includes a first bolt 83a, a chucking spigot 83c, and a first nut 83b. At least the first bolt 83a and the first nut 83b are formed in a hollow cylindrical shape. In other words, an inside of the shaft 83 penetrates in the vertical direction at least between an upper surface of the first bolt 83a and a lower surface of the first nut 83b. Preferably, the chucking spigot 83c is also formed in a hollow cylindrical shape, and the inside of the shaft 83 penetrates in the vertical direction between the upper surface of the first bolt 83a and a lower surface of the chucking spigot 83c. A hole formed in the shaft 83 described above is referred to as a through hole 98. A head of the first bolt 83a engages with the temperature adjusting unit 74. The chucking spigot 83c is gripped by the clamp 82. In other words, the locking portion 83d formed on the chucking spigot 83c is engaged with the locking balls 84 as the locking member. The first nut 83b is screwed with a threaded part of the first bolt 83a and a threaded part of the chucking spigot 83c. The shaft 83 is inserted into an insertion hole provided in the molding table 5. The insertion hole through which the shaft 83 is inserted is preferably provided at a central part of the molding table 5 in a plan view. With such a configuration, the molding table 5 is fixed to the clamp 82.

More preferably, the head of the first bolt 83a engages with the heating unit 75, and the first nut 83b engages with the cooling unit 76, thereby the heating unit 75 and the cooling unit 76 are fastened. A fastening part of the temperature adjusting unit 74 is preferably a central portion of the temperature adjusting unit 74 in a plan view.

The heating unit 75 and the cooling unit 76 are further fastened by a plurality of fastening fittings at points different from a fastening point of the first bolt 83a and the first nut 83b, that is, different from the central portion in a plan view of the temperature adjusting unit 74 in the present embodiment. Specifically, the fastening fittings include second bolts 93 and second nuts 94. The temperature adjusting unit 74 is provided with a plurality of insertion holes. The second bolt 93 and the second nut 94 are disposed in each insertion hole.

A head of the second bolt 93 engages with the heating unit 75, the second nut 94 engages with the cooling unit 76, and a threaded part of the second bolt 93 is screwed into the second nut 94. Thereby, the heating unit 75 and the cooling unit 76 are fastened. Note that the head of the second bolt 93 may be engaged with the cooling unit 76 and the second nut 94 may be engaged with the heating unit 75. Here, fastening force of the second bolt 93 and the second nut 94 is lower than fastening force of the first bolt 83a and the first nut 83b. With this configuration, the heating unit 75 and the cooling unit 76 are sufficiently fastened, and a restraint point of expansion and contraction due to the heat can be the fastening point of the first bolt 83a and the first nut 83b, that is, in the present embodiment, the central portion in a plan view. As a result, it is possible to prevent displacement between the heating unit 75 and the cooling unit 76 from occurring.

Here, it is preferable that a locking washer 95 be disposed between the second bolt 93 and the heating unit 75 and/or between the second nut 94 and the cooling unit 76. In other words, the fastening fitting preferably further includes a locking washer 95. In the case where the second bolt 93 engages with the cooling unit 76 and the second nut 94 engages with the heating unit 75, it is preferable that a locking washer 95 be disposed between the second bolt 93 and the cooling unit 76 and/or between the second nut 94 and the heating unit 75. In the present embodiment, a locking washer 95 is disposed on each side of the second bolt 93 and the second nut 94. The locking washer 95 is, for example, a Belleville washer. By disposing the locking washer 95 in this way, it is possible to prevent the second bolt 93 and the second nut 94 from loosening even if the fastening force is weakened.

A recess is formed on a top surface of the molding table 5, and a fixing plate 96 for fixing the base plate 33 is fix in the recess. The recess is formed so that a thickness of the fixing plate 96 is equal to a depth of the recess. In other words, the fixing plate 96 has the same thickness as the depth of the recess. When the fixing plate 96 is disposed in the recess, a top surface of the fixing plate 96 matches the top surface of the molding table 5. In the present embodiment, the fixing plate 96 is fixed to the molding table 5 by a bolt, but other fixing means may be used. A central portion of the base plate 33 in a plan view is fixed to the fixing plate 96 by a fixing bolt 97. On the base plate 33, the first material layer 8 and the first solidified layer are formed. When fixing the base plate 33 to the fixing plate 96, a tool is inserted from the through hole 98 and the fixing bolt 97 is rotated with the molding table 5 detached from the molding table driver 31. If the through hole 98 is formed only between the first bolt 83a and the first nut 83b, it is necessary to detach the chucking spigot 83c once to insert the tool. It is preferable that the through hole 98 be formed between the first bolt 83a and the chucking spigot 83c as in the present embodiment, because the tool can be inserted into the through hole 98 with the chucking spigot 83c screwed into the first nut 83b. A head of the fixing bolt 97 engages with the fixing plate 96, and the threaded part of the fixing bolt 97 is screwed into a tap hole formed in the base plate 33. The through hole 98 only needs to have a size that allows the tool for rotating the fixing bolt 97 to be inserted.

With such a configuration, the same fixing plate 96 can be used regardless of a size of the three-dimensional molded object and a size of the base plate 33. Further, since a size of the fixing plate 96 can be made relatively small, an influence of expansion and contraction of the fixing plate 96 due to heating and cooling can be reduced. In addition, most of the base plate 33 can be brought into contact directly with the molding table 5, and the heating and cooling efficiency by the heating unit 75 and the cooling unit 76 is improved. Note that the base plate 33 may be directly fixed to the molding table 5 without using the fixing plate 96.

A method for producing the three-dimensional molded object using the lamination molding apparatus 100 will be described with reference to FIG. 8 to FIG. 12. Here, in FIG. 8 to FIG. 12, some of the components of the lamination molding apparatus 100 shown in FIG. 1 to FIG. 7 are omitted in consideration of visibility.

The lamination molding apparatus 100 of the present embodiment is particularly effective for a producing method of a three-dimensional molded object with a relatively large temperature change of the molding table 5 or a high frequency of temperature change of the molding table 5. Such cases are, for example, that the temperature of the molding table 5 is adjusted to a relatively high temperature or low temperature, or that the heating and cooling of the molding table 5 are repeated during molding. As the producing method of the three-dimensional molded object where the heating and cooling of the molding table 5 are repeated during molding, a molding method is exampled below where a martensitic metal is used as a material for forming the material layer 8, and every time one or more solidified layers are formed, the temperature of the solidified layer(s) is adjusted so that the martensitic transformation is intentionally advanced. More specifically, every time one or more solidified layers are newly molded, the temperature of the newly molded solidified layer(s) is adjusted in the order of a heating temperature T1, a cooling temperature T2, and the heating temperature T1. At this time, the heating temperature T1 is equal to or higher than a martensitic transformation finish temperature Mf of the solidified layer, the heating temperature T1 is higher than the cooling temperature T2, and the cooling temperature T2 is equal to or lower than a martensitic transformation start temperature Ms of the solidified layer.

After solidification, a solidified body 9 before being cooled contains an austenite phase, the solidified body 9 is cooled to the cooling temperature T2, and at least a part of the austenite phase is transformed into a martensitic phase.

Figure 8:
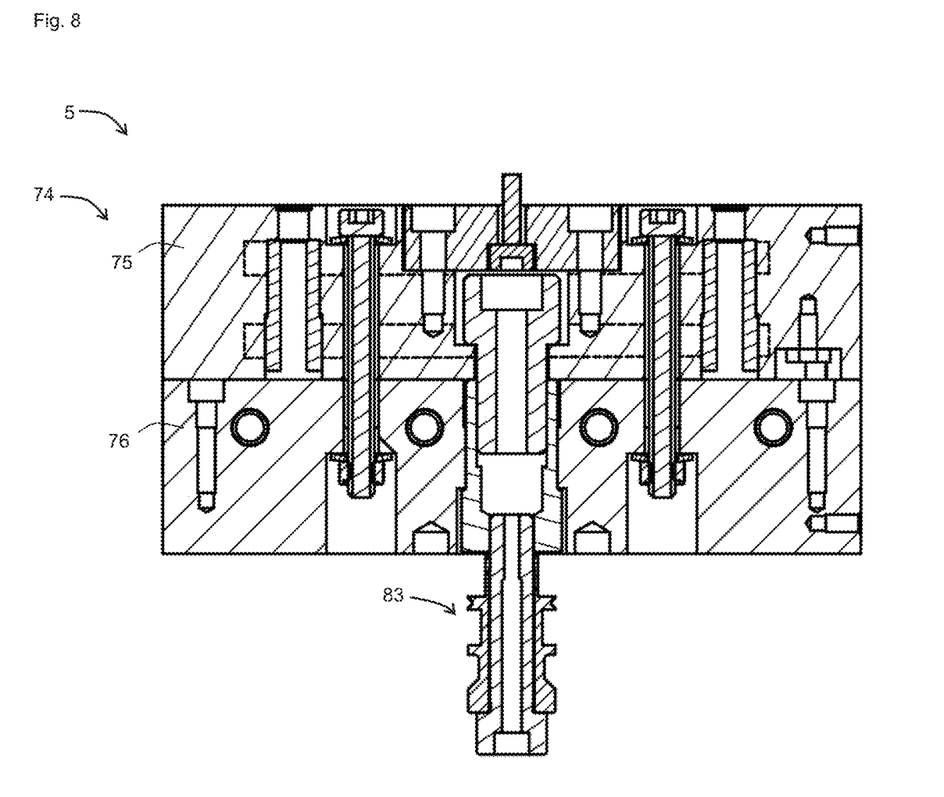
FIG. 8 is a cross-sectional view of the molding table 5 and a shaft 83.

FIG. 8 shows the molding table 5 detached from the molding table driver 31. The fixing plate 96 and the shaft 83 are fixed to the molding table 5. First, as described above, the base plate 33 is fixed to the fixing plate 96 with the fixing bolt 97 in a state that the molding table 5 is detached from the molding table driver 31. In this way, the molding table 5 on which the base plate 33 is placed, is placed on the molding table driver 31, and is fixed to the molding table driver 31 by the chuck 80. Before or after the molding table 5 is fixed to the molding table driver 31, the bellows member 20 is attached around the molding table 5.

Figure 9:
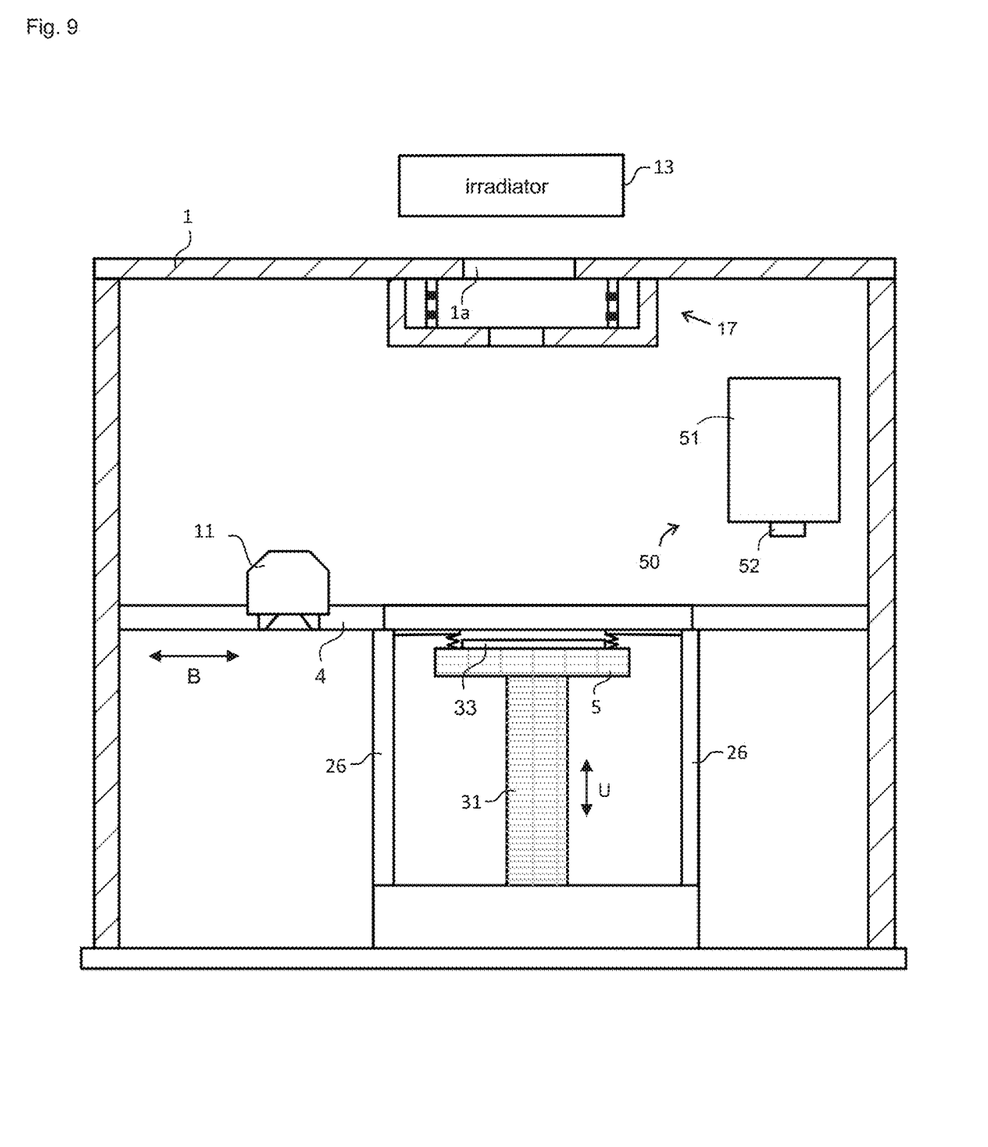
FIG. 9 is an explanatory view of a solidified layer forming step using the lamination molding apparatus 100 according to the embodiment of the present invention.

As shown in FIG. 9, a height of the molding table 5 is adjusted to an appropriate position with the base plate 33 placed on the molding table 5. After adjusting the height of the molding table 5, a solidified layer forming step is performed. In the solidified layer forming step, the molding table 5 is preheated to a temperature suitable for solidification of the material layer 8 by the heating unit 75 provided on the molding table 5. In the present embodiment, the preheating temperature is the same as the heating temperature T1. With the molding table 5 heated to the heating temperature T1, recoating step and solidifying step as described below are repeated one or more times.

In the recoating step, the recoater head 11 in which the material powder is filled in the material holding section 11*a* moves from a left side to a right side of the molding region R along the arrow B. In this way, the material layer 8 is formed on the base plate 33.

Figure 10:
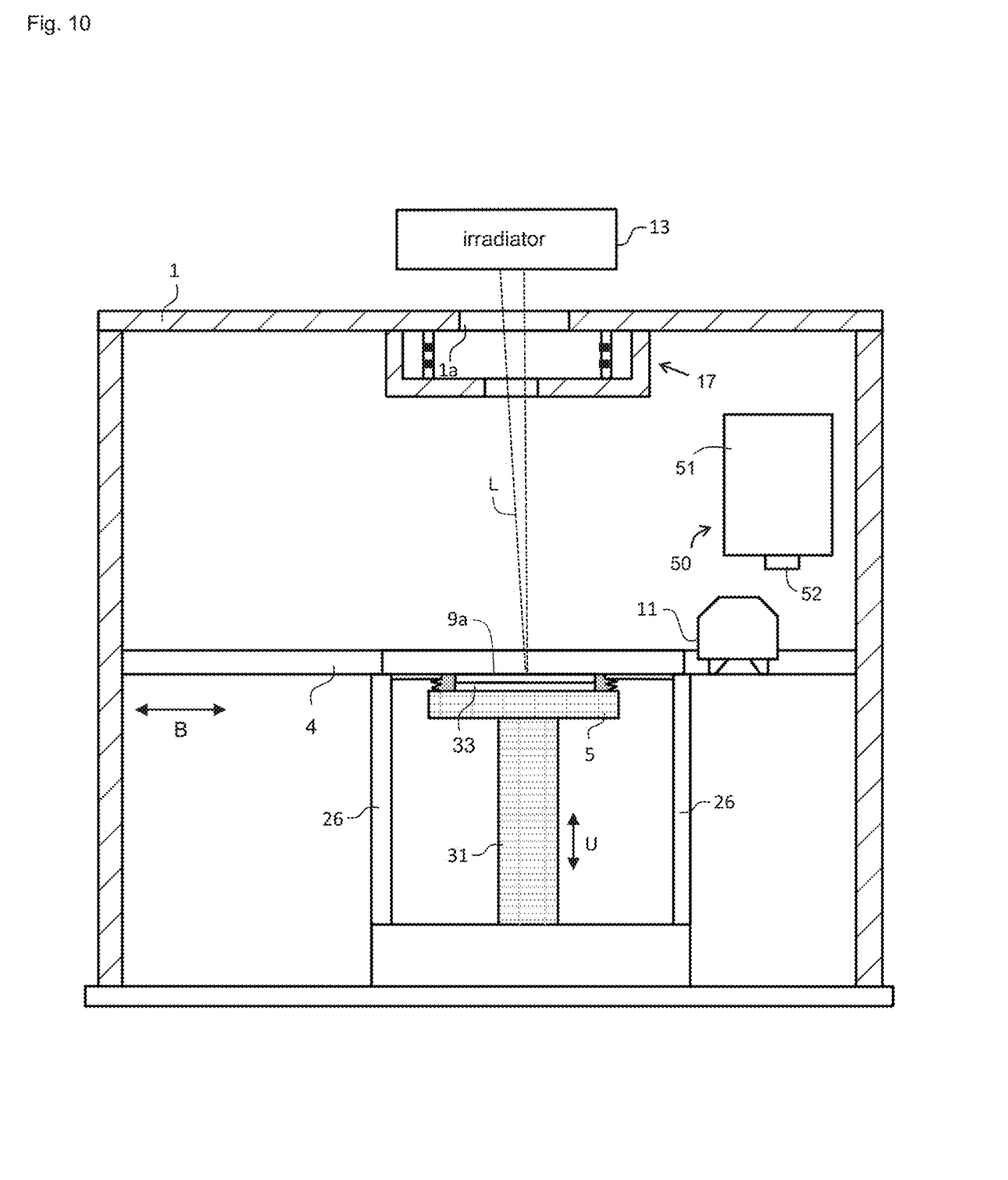
FIG. 10 is an explanatory view of the solidified layer forming step using the lamination molding apparatus 100 according to the embodiment of the present invention.

Next, as shown in FIG. 10, in the solidifying step, the irradiator 13 irradiates the irradiation region of the material layer 8 with the laser beam L, thereby melting or sintering the irradiation region, and the first solidified layer 9*a* is formed on the base plate 33.

Figure 11:
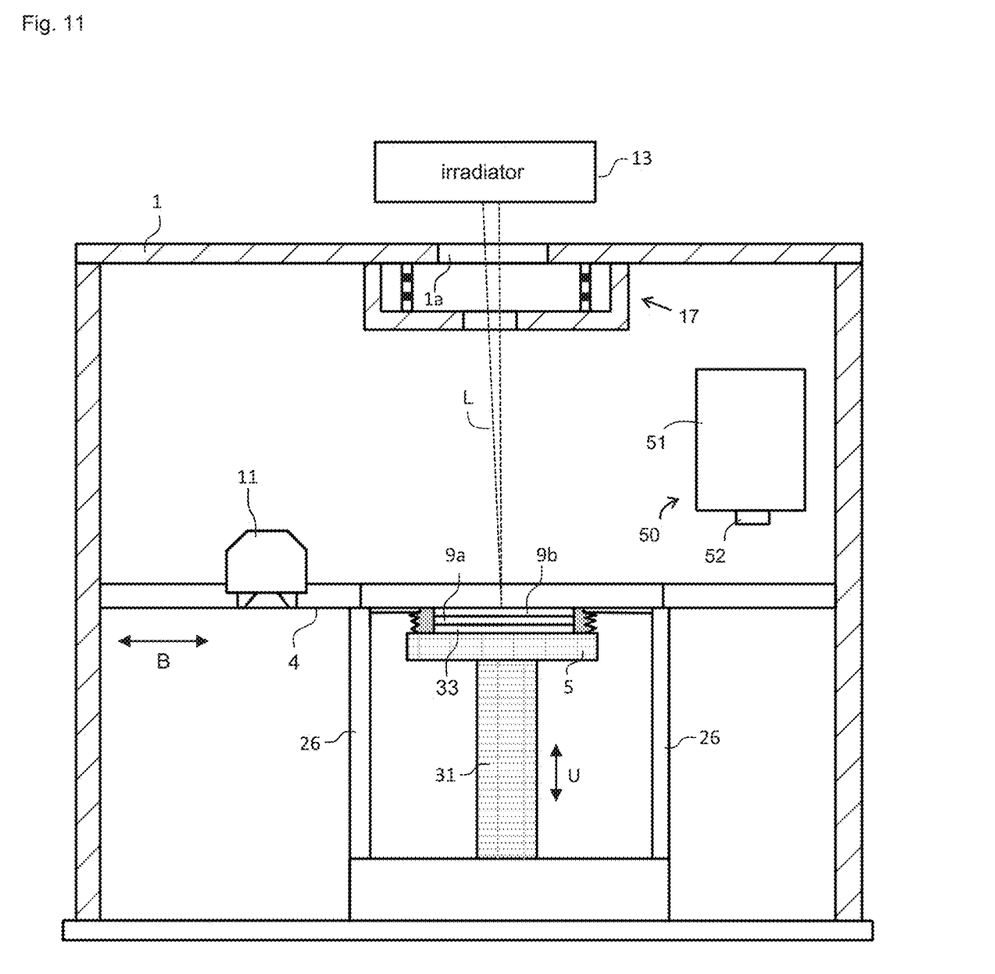
FIG. 11 is an explanatory view of the solidified layer forming step using the lamination molding apparatus 100 according to the embodiment of the present invention.

In the case that the temperature adjustment is performed on a plurality of solidified layers, the molding table 5 is lowered by a thickness of the material layer 8 as shown in FIG. 11, and the recoating step and the solidifying step are performed again. Specifically, the recoater head 11 moves from the right side to the left side of the molding region R, and the material layer 8 is formed on the molding region R. Then, the irradiator 13 irradiates the irradiation region of the material layer 8 with the laser beam L to melt or sinter the irradiation region, and the second solidified layer 9*b* is formed on the base plate 33.

In this way, in the solidified layer forming step, the solidified body 9 is formed by repeating the formation of the plurality of the solidified layers. These solidified layers which are sequentially laminated are firmly fixed to each other. Further, during the solidified layer forming step, the temperature of the molding table 5 is adjusted to the heating temperature T1 by the heating unit 75. That is, a heating step of heating the solidified body 9 to the heating temperature T1 is performed in parallel with the solidified layer forming step.

Figure 12:
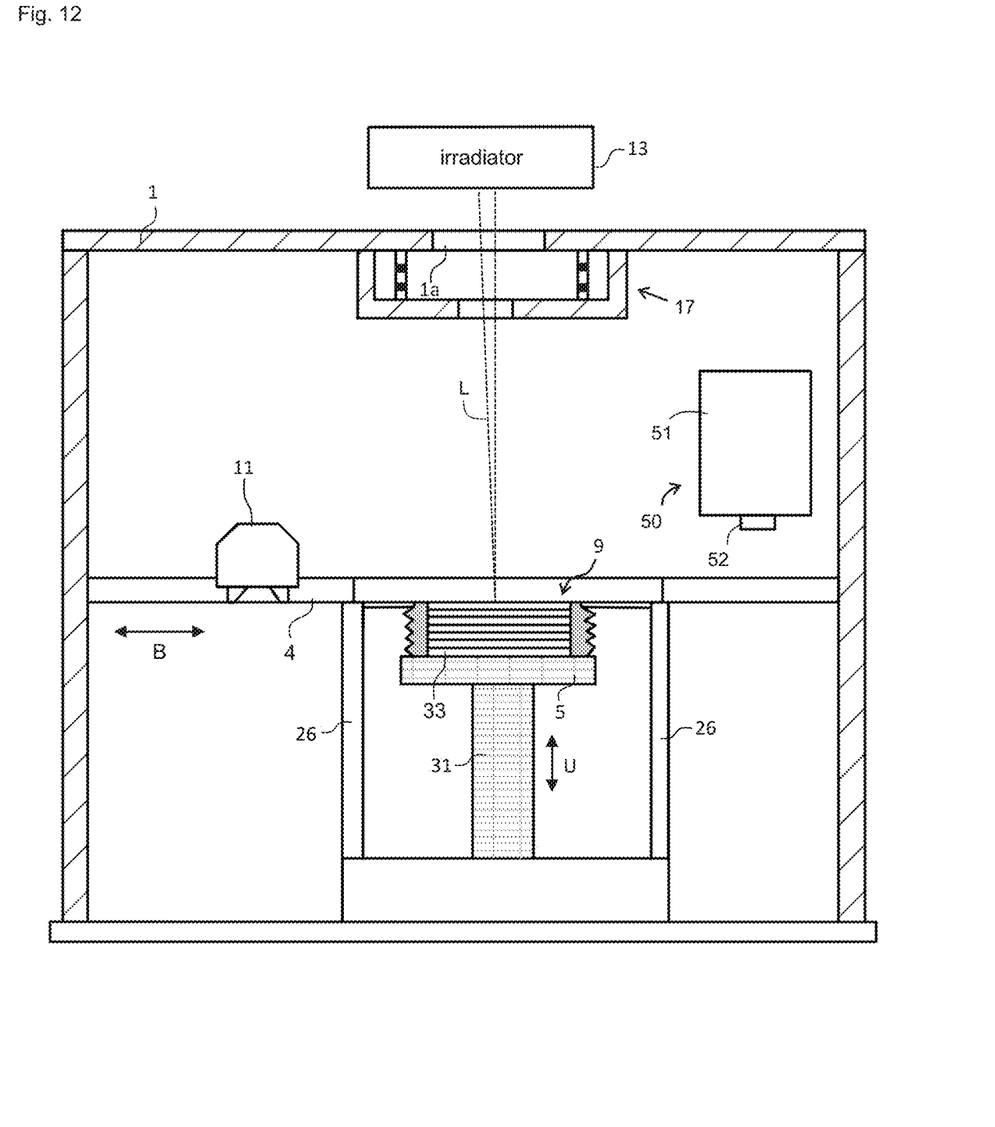
FIG. 12 is an explanatory view of the solidified layer forming step using the lamination molding apparatus 100 according to the embodiment of the present invention.

After the above steps are repeated to form one or more predetermined solidified layers, as shown in FIG. 12, a cooling step is performed by the cooling unit 76 provided on the molding table 5. In the cooling step, the temperature of the solidified body 9 is cooled to the cooling temperature T2.

When the cooling step is completed, the temperature of the molding table 5 is set to the heating temperature T1 again, and the solidified layer forming step is performed. At least until the next solidifying step is performed, the temperature of the molding table 5 is adjusted to the heating temperature T1, and the temperature of the material layer 8 is reheated to the heating temperature T1. Further, every time a predetermined number of solidified layers are formed, a processing step of performing process by the processing unit 50 may be performed on an end surface of the solidified layer.

Such steps are repeated to form a desired three-dimensional molded object. Moreover, postprocess may be performed to the three-dimensional molded object formed by the lamination molding apparatus 100 as needed. When postprocess is performed, the three-dimensional molded object is moved to an apparatus (hereinafter, postprocessing apparatus) that performs postprocess such as an electric discharge machine or a machining center. At this time, the postprocessing apparatus is provided with a clamp adjusted such that a mounting posture is the same as a mounting posture of the clamp 82 of the lamination molding apparatus 100, and the molding table 5 on which the three-dimensional molded object is placed using the clamp and the shaft 83. As a result, it is possible to maintain positioning accuracy during postprocess.

For example, the adjustment of the mounting posture of the clamp is performed as follows. A master pallet having a rectangular parallelepiped shape is prepared. A centering plate and a chucking spigot are fixed to the master pallet, and the chucking spigot is detachably gripped by the clamp 82 of the lamination molding apparatus 100 and by the clamp of the postprocessing apparatus. First, the master pallet is fixed to the clamp 82 of the lamination molding apparatus 100, and the mounting posture of the clamp 82 is adjusted such that parallelism of side surfaces of the master pallet and flatness of an upper surface of the master pallet have desired values. Next, the master pallet is moved and fixed to the clamp of the postprocessing apparatus. The mounting posture of the clamp of the postprocessing apparatus is adjusted such that parallelism of the side surfaces of the master pallet and flatness of the upper surface of the master pallet have the same values as fixed to the lamination molding apparatus 100. In this way, the mounting posture of the clamp 82 of the lamination molding apparatus 100 and the mounting posture of the clamp of the postprocessing apparatus correspond substantially.

A specific procedure for moving the three-dimensional molded object to the postprocessing apparatus will be described below. First, the unsolidified material powder in the bellows member 20 is removed by a suction device (not shown). Next, fixing of the molding table 5 by the chuck 80 is released, and the molding table 5 is detached from the lamination molding apparatus 100. The bellows member 20 is detached from the molding table 5 before or after the molding table 5 is detached. The fixing plate 96 and the base plate 33 are placed on the molding table 5 detached from the lamination molding apparatus 100, and the three-dimensional molded object is formed on the base plate 33. Also, the shaft 83 is fixed to the molding table 5. The three-dimensional molded object is placed on the clamp of the postprocessing apparatus together with the molding table 5, and the molding table 5 is fixed to the postprocessing apparatus. In this way, the molding table 5 can be placed on the postprocessing apparatus without detaching the three-dimensional molded object from the molding table 5 before postprocess and can be placed on the postprocessing apparatus in the same mounting posture as the lamination molding apparatus 100. As a result, the positioning operation can be easily performed.

As described above, in the lamination molding apparatus 100 of the present embodiment, the molding table 5 and the molding table driver 31 are detachably fixed at the one fixing point. Therefore, the displacement of the molding table 5 during molding is unlikely to occur, and workability of positioning operation in postprocess is improved. As a result, it becomes possible to perform highly accurate lamination molding.

What is claimed is:

1. A lamination molding apparatus, comprising:
a molding table including a molding region in which a desired three-dimensional molded object is formed, and a temperature adjusting unit having a heating unit with a heater and a cooling unit with a cooler, the heating unit and the cooling unit being stacked in a vertical direction;
a molding table driver moving the molding table in the vertical direction; and
a chuck fixing the temperature adjusting unit detachably to the molding table driver at one fixing point,
wherein the chuck includes a shaft locked to the temperature adjusting unit, and a clamp gripping the shaft; and
the shaft has a first bolt engaging with the temperature adjusting unit, a chucking spigot gripped by the clamp, and a first nut screwed with the first bolt and the chucking spigot.

2. The apparatus of claim 1, wherein the one fixing point is located at a central portion in a plan view of the temperature adjusting unit.

3. The apparatus of claim 1, wherein the first bolt engages with one of the heating unit and the cooling unit,
the first nut engages with the other of the heating unit and the cooling unit, and
the heating unit and the cooling unit are fastened by the first bolt and the first nut.

4. The apparatus of claim 3, further comprising:
a plurality of fastening fittings fastening the heating unit and the cooling unit at points different from a fastening point of the first bolt and the first nut, wherein
fastening force by the fastening fittings is lower than fastening force by the first bolt and the first nut.

5. The apparatus of claim 4, wherein the fastening fitting comprises
a second bolt engaging with one of the heating unit and the cooling unit,
a second nut engaging with the other of the heating unit and the cooling unit, and
a locking washer provided between the one of the heating unit and the cooling unit and the second bolt, and/or between the other of the heating unit and the cooling unit and the second nut.

6. The apparatus of claim 1, wherein the shaft is formed with a through hole penetrating in the vertical direction at least between an upper surface of the first bolt and a lower surface of the first nut.

7. The apparatus of claim 6, wherein the through hole penetrates in a vertical direction between the upper surface of the first bolt and a lower surface of the chucking spigot.

8. The apparatus of claim 1, wherein a recess is formed on a top surface of the molding table, and
the device further comprising;
a fixing plate having a thickness identical to a depth of the recess and fit in the recess, and a base plate whose central portion in a plan view is fixed to the fixing plate.

9. The apparatus of claim 1, further comprising:
a constant temperature member whose temperature is kept constant, the constant temperature member provided between the chuck and the molding table driver.

* * * * *